US 8,495,685 B2

(12) United States Patent
Moon et al.

(10) Patent No.: US 8,495,685 B2
(45) Date of Patent: Jul. 23, 2013

(54) METHOD AND APPARATUS FOR TRANSMITTING AND RECEIVING MULTI-STREAM SIGNALS IN WIRELESS TRANSMITTER/RECEIVER SYSTEM ENVIRONMENT

(75) Inventors: Jae-pil Moon, Suwon-si (KR); Byung-cheol Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 942 days.

(21) Appl. No.: 12/233,110

(22) Filed: Sep. 18, 2008

(65) Prior Publication Data

US 2009/0193473 A1 Jul. 30, 2009

(30) Foreign Application Priority Data

Jan. 24, 2008 (KR) .................... 10-2008-0007579

(51) Int. Cl.
*H04N 7/18* (2006.01)
(52) U.S. Cl.
USPC .................................. 725/81; 725/78; 725/80
(58) Field of Classification Search
USPC .................................. 725/78, 80, 81
See application file for complete search history.

(56) References Cited

U.S. PATENT DOCUMENTS

| | | | | |
|---|---|---|---|---|
| 5,996,015 A | * | 11/1999 | Day et al. | 709/226 |
| 6,076,166 A | * | 6/2000 | Moshfeghi et al. | 726/4 |
| 6,441,658 B1 | * | 8/2002 | Taraci et al. | 327/147 |
| 6,832,241 B2 | * | 12/2004 | Tracton et al. | 709/203 |
| 6,981,045 B1 | * | 12/2005 | Brooks | 709/226 |
| 7,849,486 B2 | * | 12/2010 | Russ et al. | 725/74 |
| 2003/0204844 A1 | * | 10/2003 | Brant et al. | 725/22 |
| 2005/0233728 A1 | * | 10/2005 | Karaoguz et al. | 455/406 |
| 2006/0095638 A1 | | 5/2006 | Unger | |
| 2006/0150222 A1 | * | 7/2006 | McCafferty et al. | 725/81 |
| 2008/0270890 A1 | * | 10/2008 | Stern | 715/239 |

OTHER PUBLICATIONS

Communication dated Jul. 10, 2012 issued by the Korean Intellectual Property Office in counterpart Korean Application No. 10-2008-0007579.

* cited by examiner

*Primary Examiner* — Pankaj Kumar
*Assistant Examiner* — Sahar Baig
(74) *Attorney, Agent, or Firm* — Sughrue Mion, PLLC

(57) ABSTRACT

A method and apparatus for transmitting and receiving wireless multi-band stream signals using optimal resolution in a wireless digital television transmitter/receiver environment. The method includes: receiving, from a first wireless receiver, at least one of first resolution information and first channel information of a first receiver terminal connected to the first wireless receiver; receiving, from a second wireless receiver, at least one of second resolution information and second channel information of a second receiver terminal connected to the second wireless receiver terminal; scaling a video signal according to a resolution level supported by the first receiver terminal based on the first resolution information and the first channel information and scaling the video signal according to a resolution level supported by the second receiver terminal based on the second resolution information and second channel information; and transmitting the scaled video signals to the first and second wireless receivers, respectively.

12 Claims, 11 Drawing Sheets

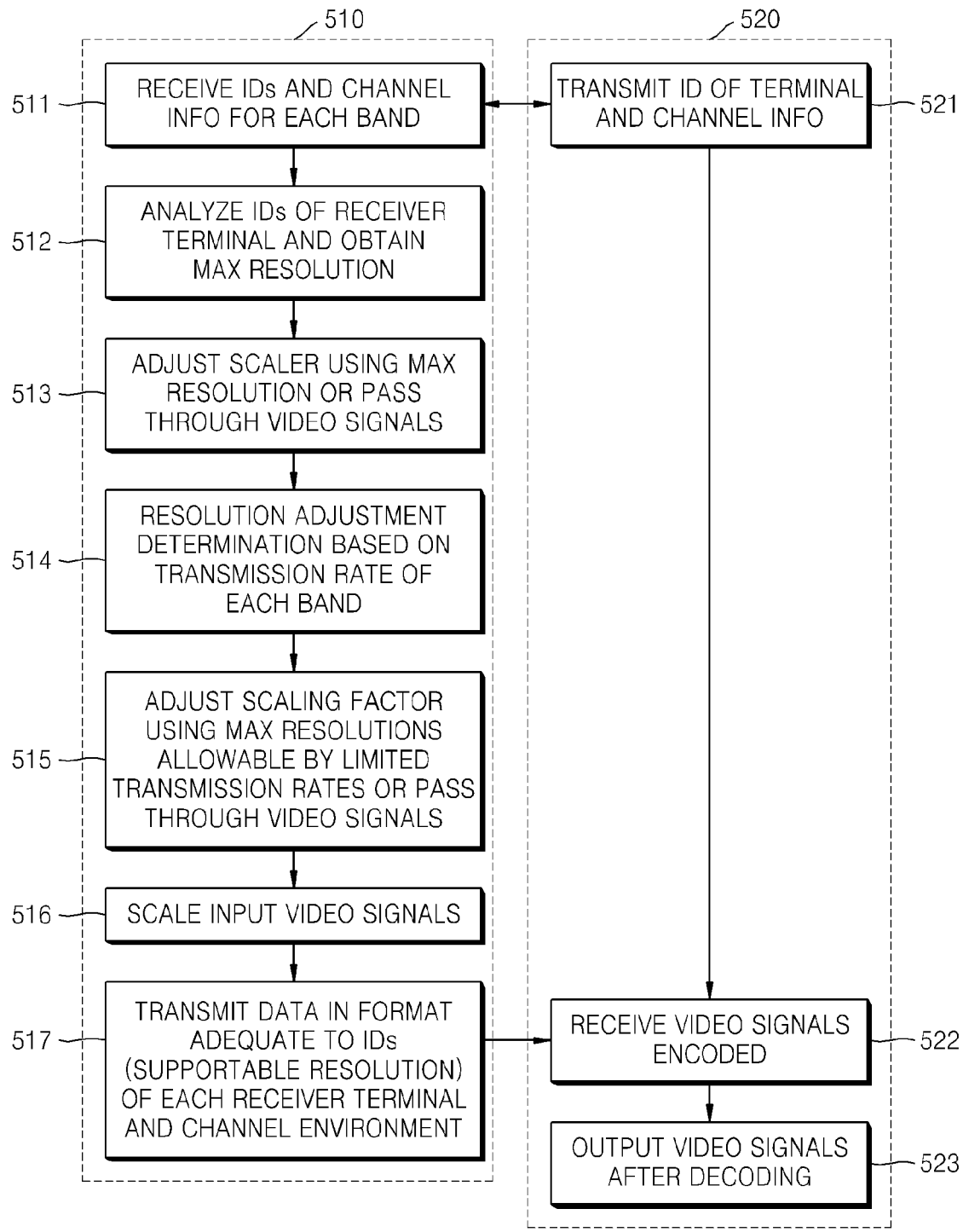

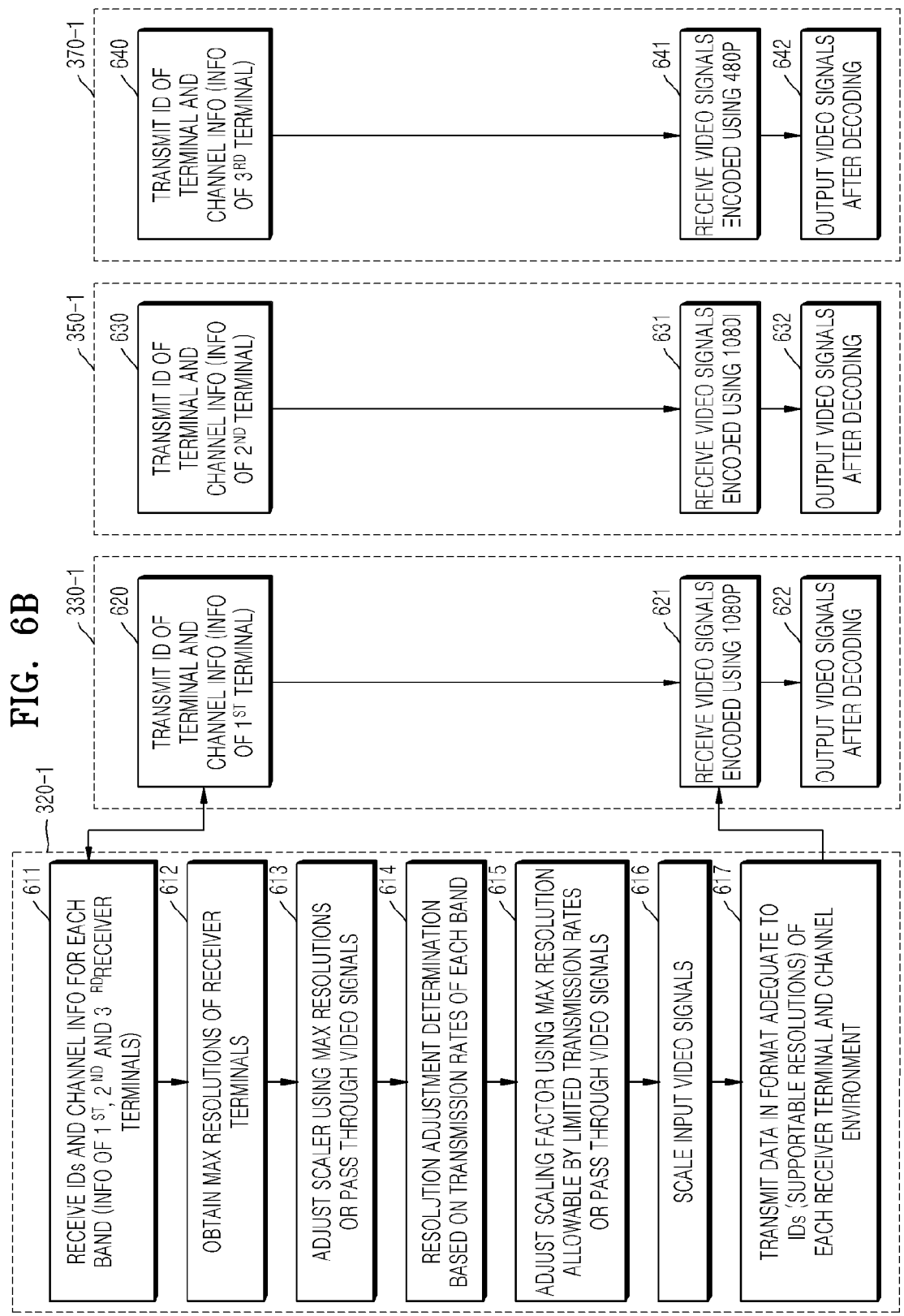

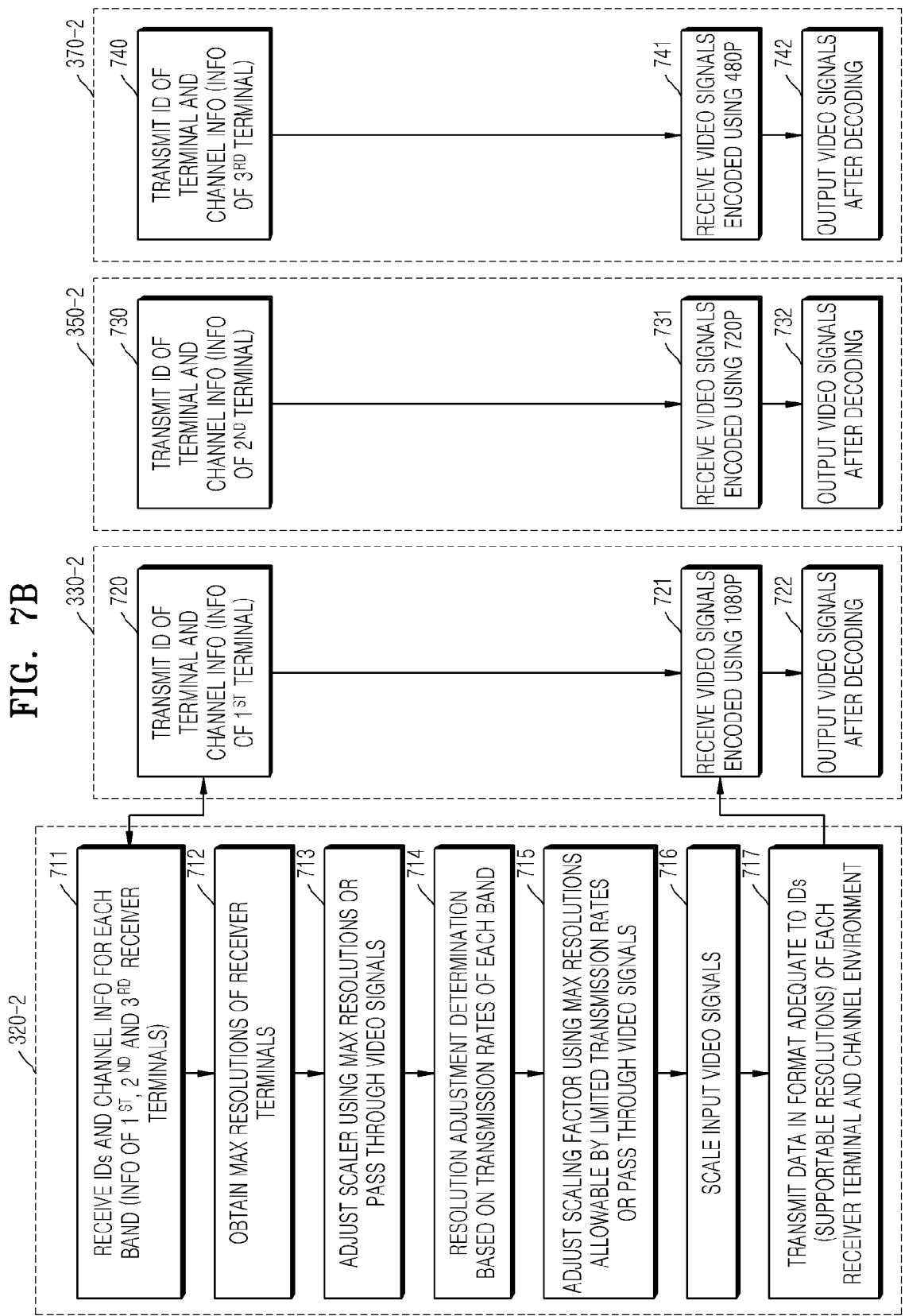

METHOD AND APPARATUS FOR TRANSMITTING AND RECEIVING MULTI-STREAM SIGNALS IN WIRELESS TRANSMITTER/RECEIVER SYSTEM ENVIRONMENT

CROSS-REFERENCE TO RELATED PATENT APPLICATION

This application claims the benefit of Korean Patent Application No. 10-2008-0007579, filed on Jan. 24, 2008, in the Korean Intellectual Property Office, the disclosure of which is incorporated herein in its entirety by reference.

BACKGROUND OF THE INVENTION

1. Field of the Invention

Methods and apparatuses consistent with the present invention relate to a multi-stream transmitter/receiver system, and more particularly, to a method and apparatus for transmitting and receiving wireless multi-band stream signals with optimal resolution in a wireless transmitter/receiver system environment.

2. Description of the Related Art

Generally, a wireless digital television (DTV) system comprises a wireless transmitter and a wireless receiver for implementing a wireless interface connection between a set-top box and a DTV set.

FIG. 1 is a schematic diagram illustrating a conventional wireless DTV system.

Referring to FIG. 1, the wireless DTV system comprises a wireless transmitter 120 connected to a signal source, such as a set-top box, and a wireless receiver 130 installed in a terminal 140, such as a DTV set.

In such a wireless DTV system, the wireless receiver 130 is often incorporated into the terminal 140. The wireless transmitter 120 transmits video signals having only a particular resolution to the wireless receiver 130.

However, when video signals having a fixed resolution are transmitted from a single wireless transmitter to a plurality of wireless receivers, each wireless receiver cannot provide different resolutions desired by a plurality of DTV sets or terminals.

Therefore, when the wireless receiver is externally mounted, or when there are a plurality of wireless receivers, the conventional video streaming technique using a fixed resolution is not adequate.

In addition, when a wireless channel environment between the wireless transmitter and the wireless receiver varies, for example, when an obstacle or barrier exists therebetween, a data transmission rate is significantly reduced, which causes image quality degradation in receiver terminals, such as a DTV set, connected to the wireless receiver.

SUMMARY OF THE INVENTION

The present invention provides a method and apparatus for transmitting and receiving wireless multi-stream signals in a wireless transmitter/receiver system environment, in which a single wireless transmitter outputs data using resolutions of a first and second receiver terminal respectively connected to a first and second wireless receiver in a wireless transmitter/receiver system having a single wireless transmitter and a plurality of wireless receivers.

BRIEF DESCRIPTION OF THE DRAWINGS

The above and other features of the present invention will become more apparent by describing in detail exemplary embodiments thereof with reference to the attached drawings in which:

FIG. 5 is a flowchart illustrating a method of transmitting multi-stream signals according to an exemplary embodiment of the present invention;

FIGS. 6A and 6B illustrate a method of transmitting multi-stream signals from a wireless transmitter to a plurality of wireless receivers, which have the same channel environment and are connected to a plurality of receiver terminals having different maximum allowable resolutions, according to an exemplary embodiment of the present invention;

FIGS. 7A and 7B illustrate a method of transmitting multi-stream signals from a wireless transmitter to a plurality of wireless receivers, which have different channel environments and are connected to a plurality of receiver terminals having the same maximum allowable resolutions, according to an exemplary embodiment of the present invention.

DETAILED DESCRIPTION OF EXEMPLARY EMBODIMENTS OF THE PRESENT INVENTION

Exemplary embodiments of the present invention will now be described in more detail with reference to the accompanying drawings.

Figure 1:
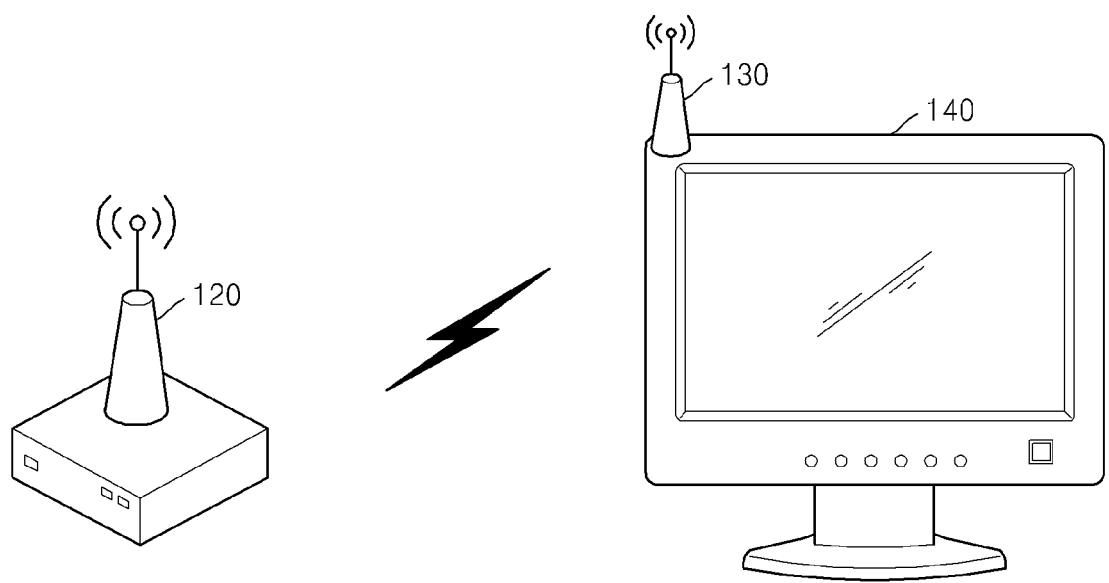
FIG. 1 is a schematic diagram illustrating a conventional wireless DTV system.
Figure 2:
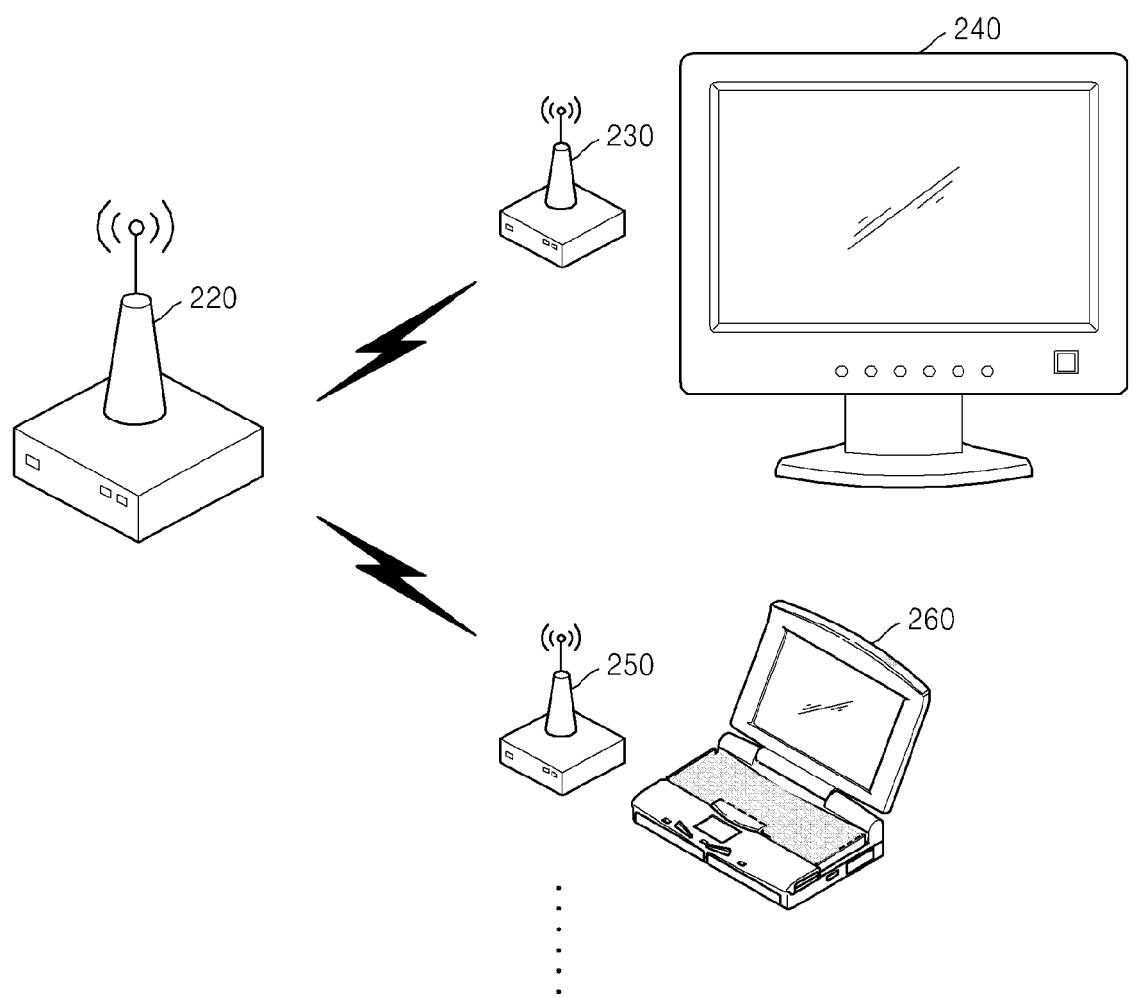
FIG. 2 is a schematic diagram illustrating a wireless multi-stream transmitter/receiver system according to an exemplary embodiment of the present invention.

FIG. 2 is a schematic diagram illustrating a wireless multi-stream transmitter/receiver system according to an exemplary embodiment of the present invention.

Referring to FIG. 2, the wireless multi-stream transmitter/receiver system comprises: a wireless transmitter 220; first and second receiver terminals 240 and 260; and first and second external wireless receivers 230 and 250 connected to the first and second receiver terminals 240 and 260, respectively, in a wired or wireless manner. The first and second receiver terminals 240 and 260 may be, for example, DTVs or Personal Digital Assistants (PDAs).

Figure 3:
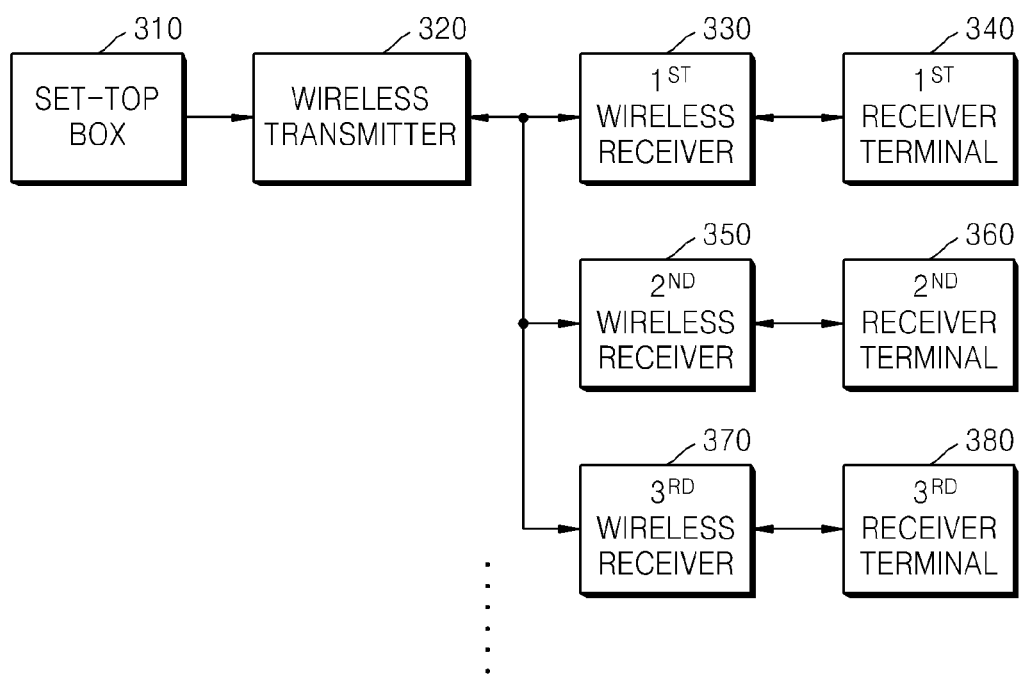
FIG. 3 is a block diagram illustrating a wireless multi-stream transmitter/receiver system according to an exemplary embodiment of the present invention.

FIG. 3 is a block diagram illustrating a wireless multi-stream transmitter/receiver system according to an exemplary embodiment of the present invention.

Referring to FIG. 3, the wireless multi-stream transmitter/receiver system comprises: a wireless transmitter 320 connected to a set-top box 310; first, second and third receiver terminals 340, 360, and 380; and first, second and third external wireless receivers 330, 350, and 370 connected to the first, second and third receiver terminals 340, 360 and 380, respectively, in a wired or wireless manner. A plurality of bands are allocated to a single channel or a plurality of channels for wireless communication between the first, second, and third wireless receivers 330, 350, and 370 and the wireless transmitter 320.

The set-top box 310 may be, for example a broadcast receiver, a Blue-ray player, or a DVD player, which converts digital audio/video signals received from an antenna to analog audio/video signals or which reproduces audio/video signals read from a recording medium.

The wireless transmitter 320 scales the video signals input from the set-top box 310 using a supportable resolution based on resolution information received from the first, second, and third wireless receivers 330, 350, and 370 and channel information extracted according to a wireless protocol agreed upon by the first, second, and third wireless receivers 330, 350, and 370. Also, the wireless transmitter 320 encodes the audio/video signals using a standard compression algorithm, and converts the encoded audio/video signals to Radio Frequency (RF) signals.

The wireless transmitter 320 obtains video resolution information of each of the receiver terminals 340, 360, and 380 from ID information or extended display identification (EDID) information extracted by the first, second, and third wireless receivers 330, 350 and 370. Also, the wireless transmitter 320 extracts channel information (e.g., a data transmission rate) based on channel selection/search according to a wireless protocol agreed upon by the first, second, and third wireless receivers 330, 350, and 370.

The first, second, and third wireless receivers 330, 350, and 370 extract video resolution information from the EDID information received via a high definition multimedia interface (HDMI) from the first, second, and third receiver terminals 340, 360, and 380, respectively. The extracted video resolution information is transmitted to the wireless transmitter 320 via a wired or wireless network. Alternatively, the first, second, and third wireless receivers 330, 350 and 370 extract video resolution information from the ID information of the first, second, and third receiver terminals 340, 360, and 380, which is defined by a user.

The first, second and third wireless receivers 330, 350, and 370 demodulate the RF signals received from the wireless transmitter 320 to extract audio/video signals.

The first, second, and third receiver terminals 340, 360, and 380 may be TV sets or PDAs. The first, second, and third wireless receivers 330, 350, and 370 display the received video signals or reproduce audio signals. The first, second and third receiver terminals 340, 360, and 380 store the EDID or ID information in a memory.

The EDID information may contain a manufacturer's identification code, a product identification code, a manufacturing date, display information such as fundamental display parameters, a maximum resolution, color properties, timing information, and check-sum bytes for error detection.

Figure 4:
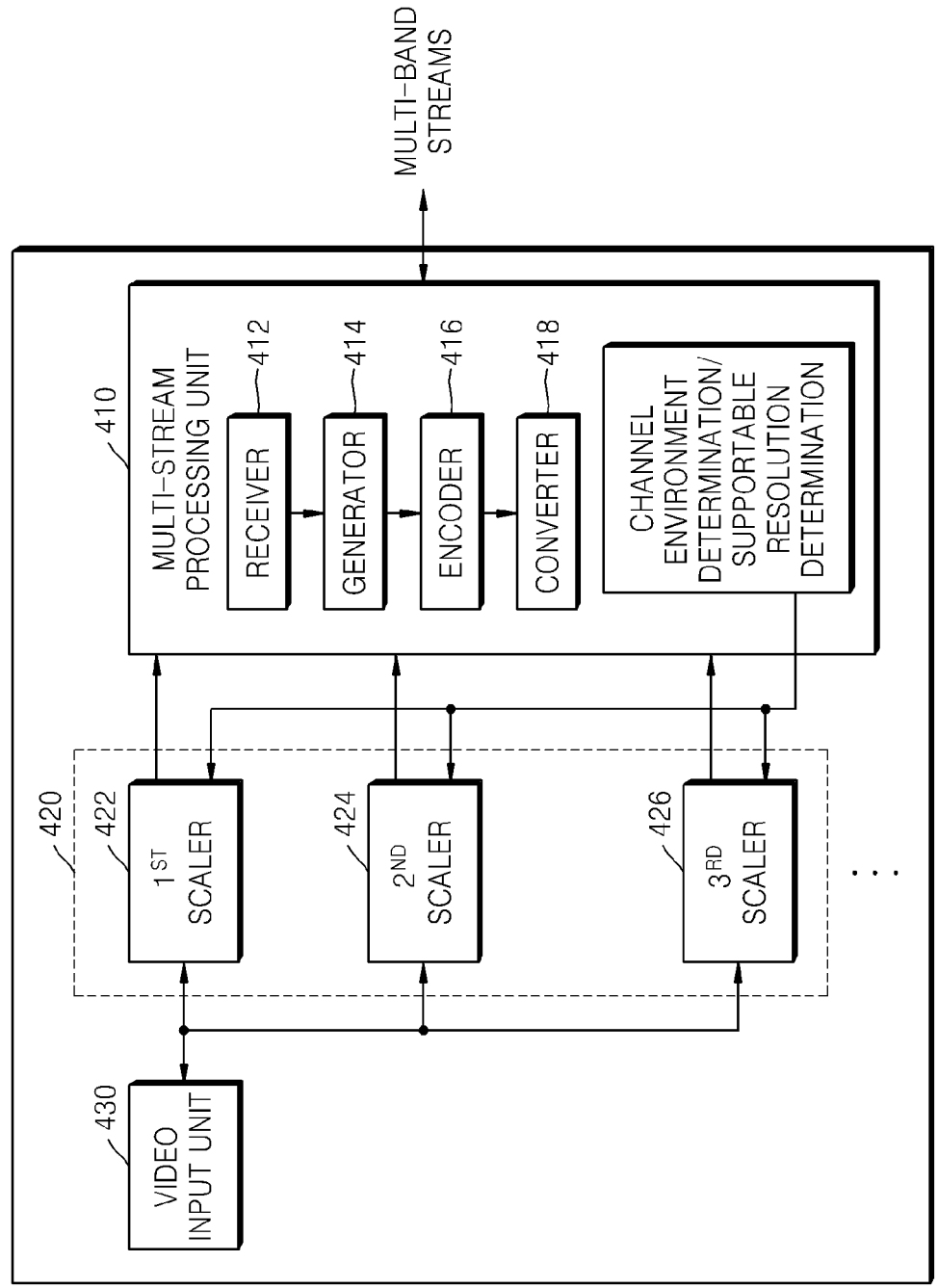
FIG. 4 is a detailed view illustrating a wireless transmitter of FIG. 3, according to an exemplary embodiment of the present invention.

FIG. 4 is a detailed view illustrating the wireless transmitter 320 of FIG. 3, according to an exemplary embodiment of the present invention.

Referring to FIG. 4, the wireless transmitter 320 comprises a multi-stream processing unit 410, a scaler unit 420, and a video input unit 430.

The multi-stream processing unit 410 comprises a receiver 412, a generator 414, an encoder 416, and a converter 418. The receiver 412 receives resolution information and channel environment from the streaming signals of the corresponding wireless receiver via one of a plurality of frequency bands allocated to the channel. Based on the channel environment and the resolution information, the generator 414 generates a scale adjustment signal for scaling video signals using a resolution supportable by the terminal. The encoder 416 encodes the scaled video signals using a standard compression algorithm, and the encoded audio/video signals are converted to RF signals by the converter 418.

The scaler unit 420 scales or passes the video signals input from the video input unit 430 through depending on the scaling adjustment signal generated by the multi-stream processing unit 410. In this case, the scaler unit 420 is divided into first, second, and third scalers 422, 424, and 426 in association with the first, second, and third wireless receivers 330, 350, and 370 to which different frequency bands are allocated.

The video input unit 430 receives video signals output from the set-top box 310 and having a predetermined resolution.

FIG. 5 is a flowchart illustrating a method of transmitting multi-stream signals according to an exemplary embodiment of the present invention.

First, the wireless transmitter 510 and the wireless receiver 520 perform a channel set-up and interconnection processing with each other according to a predetermined wireless protocol.

When the wireless receiver 520 is connected to each receiver terminal in a wired or wireless manner, the wireless receiver 520 collects ID or EDID information of the receiver terminal using the HDMI.

Subsequently, the wireless receiver 520 transmits to the wireless transmitter 510 the EDID and ID information collected from each receiver terminal and channel information according to a protocol agreed upon by the wireless transmitter 510 (in operation 521).

Then, the wireless transmitter 510 receives the ID information of the receiver terminal for each frequency band from the wireless receiver 520, and also receives the channel information of the wireless receiver 520 according to a wireless protocol (in operation 511). The ID information of the receiver terminal may contain a manufacturer identification code, a product identification code, a manufacturing data, fundamental display parameters, a maximum resolution, color properties, timing information, and so on. In addition, the channel information of the receiver terminal may contain a data transmission rate.

Then, the wireless transmitter 510 analyzes the ID information of each receiver terminal, received from the wireless receiver 520, to obtain the maximum resolution (in operation 512).

Then, the wireless transmitter 510 adjusts the scaling factor of the scaler using the maximum resolution based on the resolution information of each receiver terminal, or passes the signals through (i.e. without adjusting the scaling factor, in operation 513).

Then, the wireless transmitter 510 determines the resolution adjustment based on the data transmission rate extracted from the channel information of each frequency band (in operation 514).

Then, the wireless transmitter 510 adjusts the scale factor using the maximum allowable resolution within a limited data transmission rate for each frequency band, or passes the signals through (in operation 515).

Then, the wireless transmitter 510 scales the input video signals to the maximum allowable resolution (in operation 516).

Then, the wireless transmitter 510 encodes the video signals into a format adequate for the ID information (a allowable resolution) of each receiver terminal and the channel environment, and transmits the encoded video signals to the wireless receiver 520 using the corresponding frequency band (in operation 517).

Then, the wireless receiver 520 receives the video signals from the wireless transmitter 510 using the corresponding frequency band (in operation 522).

Finally, the wireless receiver 520 recovers the compressed video signals into original video signals using a predetermined signal recovery algorithm, and outputs the recovered video signals to each receiver terminal (in operation 523).

Figure 6A:
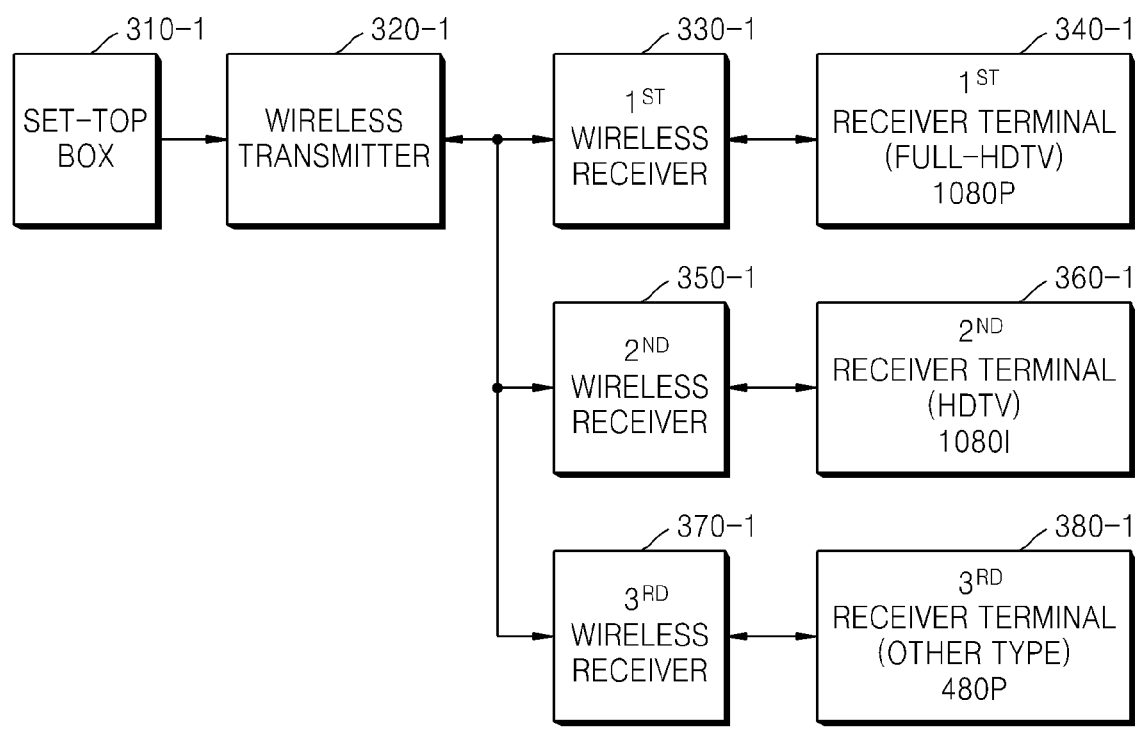

FIGS. 6A and 6B illustrate a method of transmitting multi-stream signals from a wireless transmitter to wireless receivers when a plurality of receiver terminals having the same channel environment and different maximum resolutions are connected to the wireless receivers, according to an exemplary embodiment of the present invention.

Referring to FIG. 6A, the wireless transmitter 320-1 inputs video signals having a resolution of 1080P received from set-top box 310-1. It is assumed that the first receiver terminal 340-1 is a full-HDTV set with a resolution of 1080P; the second receiver terminal 360-1 is a HDTV set with a resolution of 1080I; and the third receiver terminal 380-1 is a PDA with a resolution of 480P. Also, it is assumed that all of the first, second and third wireless receivers 330-1, 350-1 and 370-1 have the same data transmission rate of 100 Mbps.

Referring to FIG. 6B, the first, second and third wireless receivers 330-1, 350-1 and 370-1 collect IDs of the first, second and third receiver terminals 340-1, 360-1 and 380-1, respectively, and transmit the collected IDs of the receiver terminals and channel information according to a wireless protocol to the wireless transmitter 320-1 (in operation 620, 630 and 640).

Subsequently, the wireless transmitter 320-1 receives ID information of the first, second and third receiver terminals 340-1, 360-1 and and channel information of each wireless receiver for each frequency band from first, second and third wireless receivers 330-1, 350-1 and 370-1 (in operation 611).

Then, the wireless transmitter 320-1 obtains maximum resolutions (i.e., 1080P, 1080I, and 480P) of the first, second and third receiver terminals 340-1, 360-1 and 380-1 from the received ID information of each terminal (in operation 612).

Then, the wireless transmitter 320-1 adjusts scale factors of the scalers of each receiver terminal depending on the maximum resolutions of each receiver terminals (in operation 613). That is, the first scaler corresponding to the first receiver terminal 340-1 passes the signals through without scaling at a resolution of 1080P; the second scaler corresponding to the second receiver terminal 360-1 downscales the resolution of the video signals from 1080P to 1080I; and the third scaler corresponding to the third receiver terminal 380-1 downscales the resolution of the video signals from 1080P to 480P.

Then, the wireless transmitter 510 determines the resolution adjustment based on the data transmission rate extracted from the channel information of each frequency band (in operation 614). In this case, since a maximum data transmission rate is ensured for each frequency band, the wireless transmitter 320-1 determines that the maximum allowable resolution is ensured for each receiver terminal.

Then, since the maximum allowable resolution can be supported within the current transmission rate, the wireless transmitter 320-1 establishes a video pass through mode (i.e. to pass the signals through without scaling) in the scalers for each receiver terminal (in operation 615).

Then, the wireless transmitter 320-1 scales the input video signals using the maximum allowable resolution of each receiver terminal (in operation 616).

Then, the wireless transmitter 320-1 encodes the video signals into a format adequate for the ID (i.e., an allowable resolution) and the channel environment of each receiver terminal, and transmits the encoded video signals to the corresponding wireless receivers 330-1, 350-1 and 370-1 for each frequency band (in operation 617).

Then, each wireless receiver 330-1, 350-1 and 370-1 receives the video signals via the corresponding frequency band. That is, the first wireless receiver 330-1 receives the video signals encoded with a resolution of 1080P (in operation 621); the second receiver 350-1 receives the video signals encoded with a resolution of 1080I (in operation 631); and the third wireless receiver 370-1 receives the video signals encoded with a resolution of 480P (in operation 641).

Finally, each wireless receiver 330-1, 350-1 and 370-1 recovers the compressed video signals into original video signals using a predetermined signal recovery algorithm, and outputs the recovered video signals to each receiver terminal (in operation 622, 632 and 642).

Figure 7A:
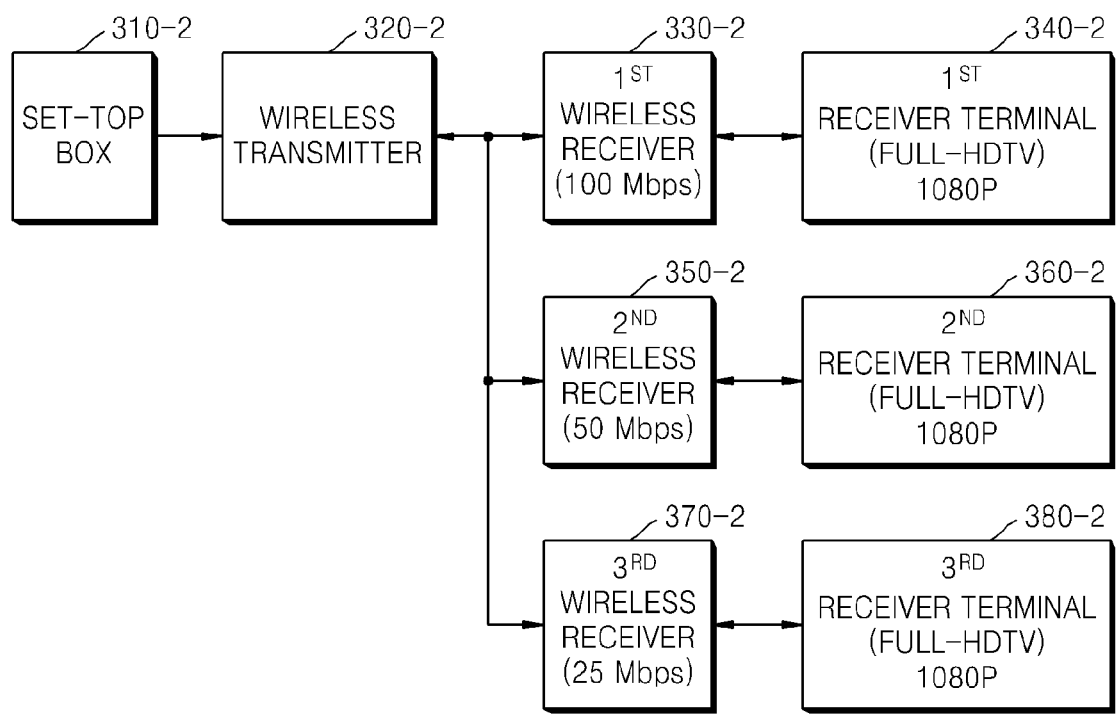

FIGS. 7A and 7B illustrates a method of transmitting multi-stream signals from a wireless transmitter to a plurality of wireless receivers, which have different channel environments and are connected to a plurality of receiver terminals having the same maximum allowable resolution, according to an exemplary embodiment of the present invention.

Referring to FIG. 7A, the wireless transmitter 320-2 inputs video signals having a resolution of 1080P received from set-top box 310-2. It is assumed that all of the first, second and third receiver terminals 340-2, 360-2, and 380-2 are full-HDTV sets with a resolution of 1080P. In addition, the first, second, and third wireless receivers 330-2, 350-2 and 370-2 have wireless channel environments of data transmission rates of 100 Mbps, 50 Mbps and 25 Mbps, respectively.

Referring to FIG. 7B, the first, second and third wireless receivers 330-2, 350-2 and 370-2 collect IDs of the first, second and third receiver terminals 340-2, 360-2, and 380-2, respectively, and transmit the collected IDs of the receiver terminals and channel information based on a wireless protocol to the wireless transmitter 320-2 (in operation 720, 730 and 740, respectively).

Subsequently, the wireless transmitter 320-2 receives the IDs of the first, second and third receiver terminals 340-2, 360-2 and 380-2 and the channel information of the first, second and third wireless receivers 330-2, 350-2 and 370-2 for each frequency band (in operation 711).

Then, the wireless transmitter 320-2 obtains maximum allowable resolutions (i.e., 1080P, 1080P, and 1080P, respectively) of the first, second and third receiver terminals 340-2, 360-2, and 380-2 from the received ID information of each terminal (in operation 712).

Then, the wireless transmitter 320-2 adjusts scaling factors of scalers for each receiver terminal depending on the maximum allowable resolutions of each receiver terminal (in operation 713). In this case, all of the first, second, and third scalers corresponding to the receiver terminals 340-2, 360-2, and 380-2 are set to a video pass through mode.

Then, the wireless transmitter 320-2 determines the supportable resolution adjustment based on data transmission rates of each frequency band (in operation 714). That is, it is determined that the supportable resolutions are 1080P@60 Hz, 720P@60 Hz, and 480P@60 Hz in the transmission rates 100 Mbps, 50 Mbps and 25 Mbps, respectively.

Then, the wireless transmitter 320-1 adjusts scale factors of the scalers using the maximum allowable resolutions within a limited data transmission rate (in operation 715). That is, the first scaler corresponding to the first receiver terminal 340-2 passes the signals through without scaling at a resolution of 1080P; the second scaler corresponding to the second receiver terminal 360-2 downscales the resolution from 1080P to 720I; and the third scaler corresponding to the third receiver terminal 380-2 downscales the resolution from 1080P to 480P.

Then, the wireless transmitter 320-2 scales the input video signals using the maximum allowable resolutions of each receiver terminal (in operation 716).

Then, the wireless receiver 320-2 encodes the video signals into a format adequate to the IDs (i.e., supportable resolutions) of each receiver terminal and channel environments, and transmits the encoded video signals to each wireless receiver 330-2, 350-2 and 370-2 using the corresponding frequency band.

Then, the wireless receivers 330-2, 350-2 and 370-2 receive the encoded video signals using the corresponding frequency band. That is, the first wireless receiver 330-2 receives the video signals encoded with a resolution of 1080P (in operation 721); the second wireless receiver 350-2 receives the video signals encoded with a resolution of 720P (in operation 731); and the third wireless receiver 370-2 receives the video signals with a resolution of 480P (in operation 741).

Finally, each wireless receiver 330-2, 350-2 and 370-2 recovers the compressed video signals into original video signals using a predetermined signal recovery algorithm, and outputs the recovered video signals to each receiver terminal (in operation 722, 732 and 742).

Figure 8A:
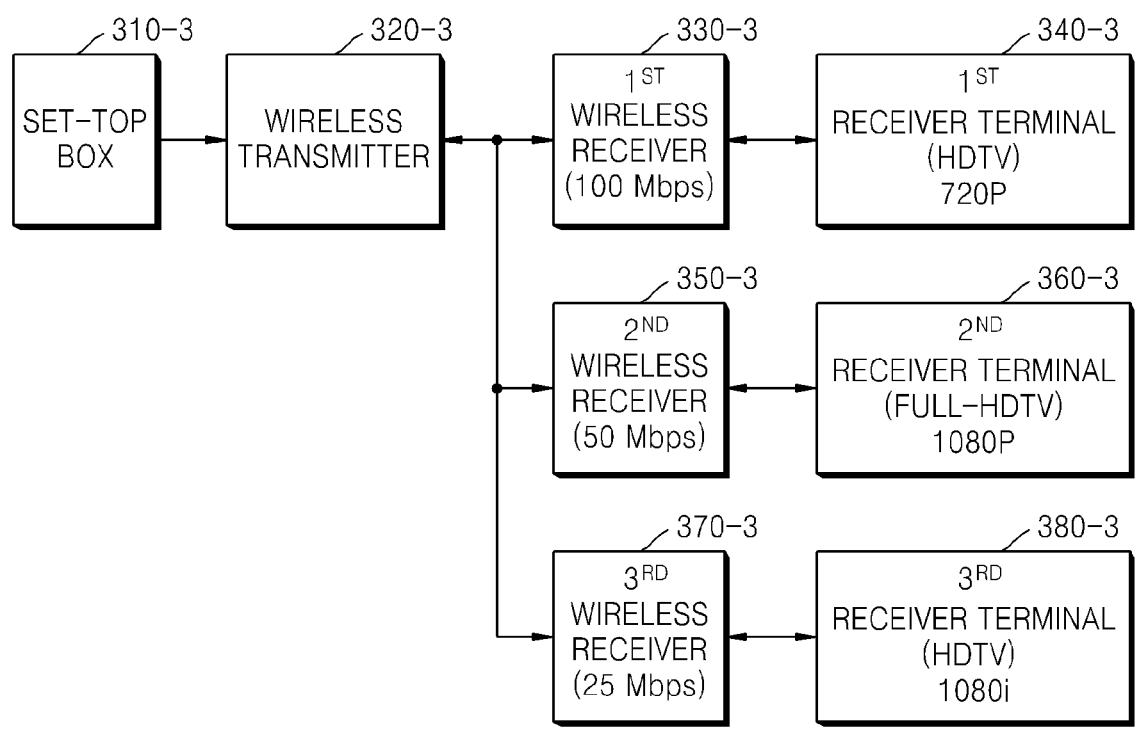
FIGS. 8A and 8B illustrate a method of transmitting multi-stream signals from a wireless transmitter to a plurality of wireless receivers, which have different channel environments and are connected to a plurality of receiver terminals having different maximum allowable resolutions, according to an exemplary embodiment of the present invention.
Figure 8B:
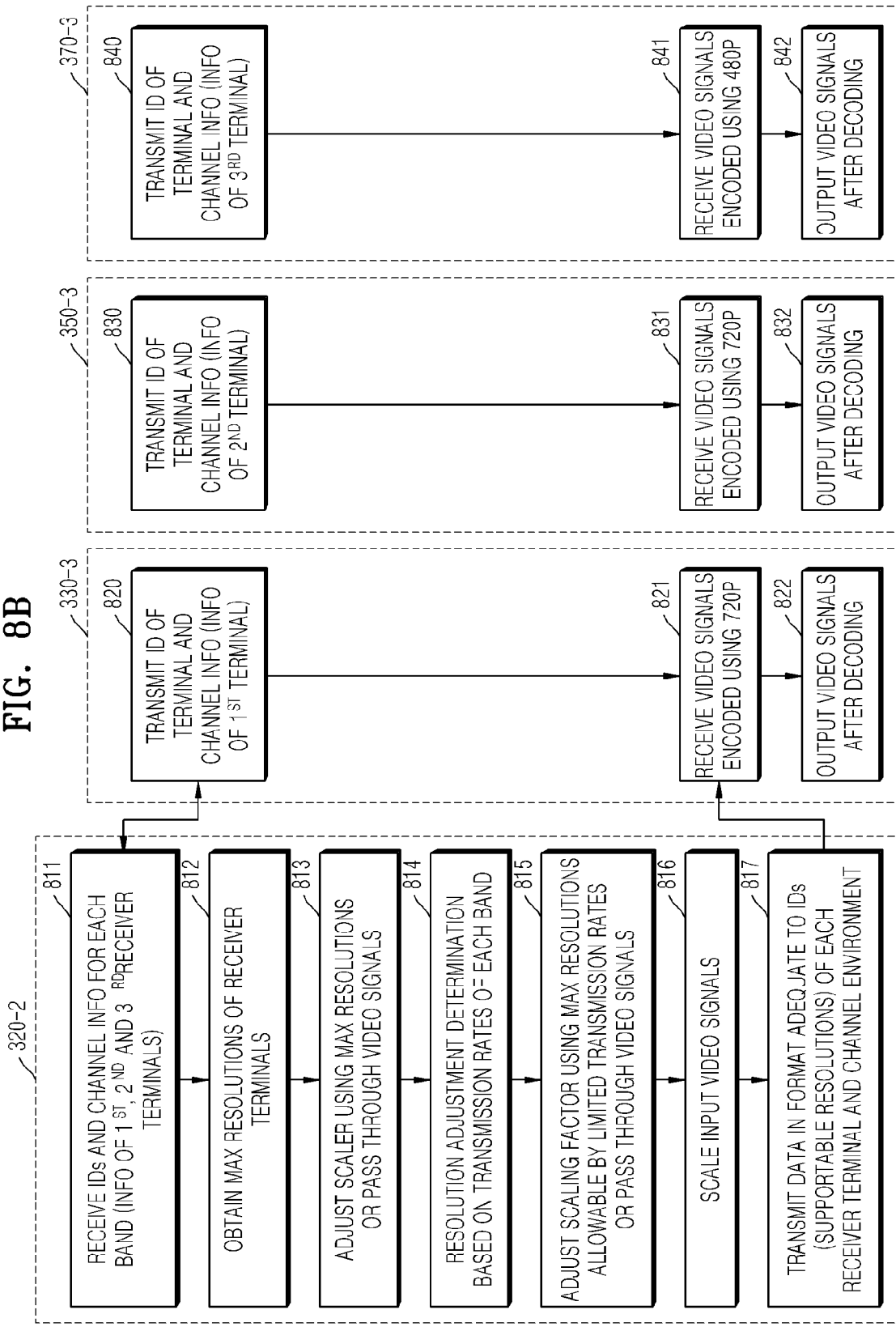

FIGS. 8A and 8B illustrates a method of transmitting multi-stream signals from a wireless transmitter to a plurality of wireless receivers, which have different channel environments and are connected to a plurality of receiver terminals having different maximum allowable resolutions, according to an exemplary embodiment of the present invention.

Referring to FIG. 8A, the wireless transmitter 320-3 inputs video signals having a resolution of 1080P received from set-top box 310-3. It is assumed that the first receiver terminal 340-3 is a HDTV set with a resolution of 720P; the second receiver terminal 360-3 is a full-HDTV set with a resolution of 1080P; and the third receiver terminal 380-3 is a HDTV set with a resolution of 1080I. In addition, the first, second and third wireless receivers 330-3, 350-3, and 370-3 have wireless channel environments of data transmission rates of 100 Mbps, 50 Mbps and 25 Mbps, respectively.

Referring to FIG. 8B, the first, second and third wireless receivers 330-3, 350-3 and 370-3 collect IDs of the first, second and third receiver terminals 340-3, 360-3, and 380-3, respectively, and transmit the collected IDs of the receiver terminals and channel information based on a wireless protocol to the wireless transmitter 320-3 (in operation 820, 830 and 840, respectively).

Subsequently, the wireless transmitter 320-3 receives the IDs of the first, second and third receiver terminals 340-3, 360-3, and 380-3 and the channel information of the first, second and third wireless receivers 330-3, 350-3 and 370-3 for each frequency band (in operation 811).

Then, the wireless transmitter 320-3 obtains maximum allowable resolutions (i.e., 720P, 1080P and 1080I, respectively) of the first, second and third receiver terminals 340-3, 360-3, and 380-3 from the received ID information of each terminal (in operation 812).

Then, wireless transmitter 320-3 adjusts scaling factors of scalers for each receiver terminal depending on the maximum allowable resolutions of each receiver terminal (in operation 813). That is, the first scaler corresponding to the first receiver terminal 340-3 downscales the resolution from 1080P to 720P; the second scaler corresponding to the second receiver terminal 360-3 passes the signals through without scaling at a resolution of 1080P; and the third scaler corresponding to the third receiver terminal 380-3 downscales the resolution from 1080P to 1080I.

Then, the wireless transmitter 320-3 determines the supportable resolution adjustment based on data transmission rates of each frequency band (in operation 814). That is, it is determined that the supportable resolutions are an input video resolution, 720P@60 Hz, and 480P@60 Hz in the transmission rates 100 Mbps, 50 Mbps and 25 Mbps, respectively.

Then, the wireless transmitter 320-3 adjusts scale factors of the scalers using the maximum allowable resolutions within a limited data transmission rate (in operation 815). That is, the first scaler corresponding to the first receiver terminal 340-3 passes the signals through without scaling at a resolution of 720P in view of the maximum allowable resolution; the second scaler corresponding to the second receiver terminal 360-3 downscales the resolution from 1080P to 720P; and the third scaler corresponding to the third receiver terminal 380-3 downscales the resolution from 1080P to 480P.

Then, the wireless transmitter 320-3 scales the input video signals to the maximum allowable resolutions of each receiver terminal (in operation 816).

Then, the wireless transmitter 320-3 encodes the video signals into a format adequate to the IDs (i.e., supportable resolutions) of each receiver terminal and channel environments, and transmits the encoded video signals to each wireless receiver 330-3, 350-3 and 370-3 using the corresponding frequency band (in operation 817).

Then, the wireless receivers 330-3, 350-3, and 370-3 receive the encoded video signals using the corresponding frequency band. That is, the first wireless receiver 330-3 receives the video signals encoded with a resolution of 720P (in operation 821); the second wireless receiver 350-3 receives the video signals encoded with a resolution of 720P (in operation 831); and the third wireless receiver 370-3 receives the video signals encoded with a resolution of 480P (in operation 841).

Finally, each wireless receiver 330-3, 350-3 and 370-3 recovers the compressed video signals into original video signals using a predetermined signal recovery algorithm, and outputs the recovered video signals to each receiver terminal (in operation 822, 832 and 842).

As described above, according to the present invention, the wireless transmitter can be adjusted up to a maximum allowable resolution depending on each channel environment. In addition, it is possible to transmit data having an optimal resolution to a plurality of terminals by modifying the data from the wireless transmitters in the form of a maximum resolution allowable by the terminals connected to each receiver terminal.

Furthermore, the wireless transmitter according to the present invention receives the resolutions and transmission environment information of each wireless receiver. Therefore, the maximum allowable resolution can be determined for each channel based on characteristics of the terminals, and the data can be modified depending on the maximum allowable resolution.

Also, according to the present invention, it is possible to output data from a single wireless transmitter to a plurality of DTVs or terminals connected to a plurality of external receivers.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices. In an alternative embodiment, the computer readable recording medium may be carrier waves (such as data transmission through the Internet). The computer readable recording medium can also be distributed over network coupled computer systems so that the computer readable codes are stored and executed in a distributed fashion.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A method of transmitting wireless multi-stream signals in a wired/wireless transmitter/receiver system, the method comprising:
   receiving from a plurality of wire/wireless receivers connected to a plurality of receiver terminals, resolution information of the plurality of receiver terminals and channel information of the plurality of wire/wireless receivers, wherein the plurality of wire/wireless receivers have different frequency bands;
   adjusting a resolution level allowable by each of the plurality of receiver terminals based on a data transmission rate extracted from the channel information of each of the plurality of wire/wireless receivers;
   scaling video signals using the resolution level allowable by each of the plurality of receiver terminals based on the resolution information and the channel information for each frequency band; and
   transmitting the scaled video signals to the plurality of wired/wireless receivers for each frequency band.

2. The method according to claim 1, wherein the resolution information of the receiver terminal is extracted from an identification (ID) of the receiver terminal, which is defined by a user.

3. The method according to claim 1, wherein the channel information includes a data transmission rate determined according to a predetermined wired/wireless protocol used between wired/wireless transmitters and receivers.

4. The method according to claim 1, wherein the scaling of video signals using the resolution level allowable by each receiver terminal comprises:
   extracting a maximum resolution of each receiver terminal from the resolution information received for each frequency band;
   adjusting the scaling factors using the extracted maximum resolution of each receiver terminal;
   extracting data transmission rates of each frequency band from the channel information for each frequency band;
   adjusting the scaling factors using a maximum allowable resolution within the extracted data transmission rate; and
   scaling the video signals for each frequency band.

5. The method according to claim 1, wherein, in the scaling of video signals using the resolution level allowable by each receiver terminal, the video signals are scaled using maximum allowable resolutions of each receiver terminal when each receiver terminal has a different resolution, and when each receiver terminal has the same receiver channel environment.

6. The method according to claim 1, wherein, in the scaling of video signals using the resolution level allowable by each receiver terminal, the video signals are scaled using maximum resolutions corresponding to data transmission rates allowable by each receiver terminal when each receiver terminal has the same resolution, and each receiver terminal has a different receiver channel environment.

7. The method according to claim 1, wherein, in the scaling video signals using the resolution level allowable by each receiver terminal, the video signals are scaled using a resolution corresponding to the maximum resolution and the data transmission rate supportable by each receiver terminal when each receiver terminal has a different resolution, and each receiver terminal has a different receiver channel environment.

8. A method of receiving wireless multi-stream signals in a wired/wireless transmitter/receiver system, the method comprising:
   receiving each resolution information from a plurality of receiver terminals connected in a wired or wireless manner and transmitting the resolution information and channel information to a wireless transmitter;
   the wireless transmitter receiving video signals scaled using an allowable resolution based on the resolution information of the receiver terminal and the channel information; and
   decoding the scaled video signals and outputting the decoded video signals to the corresponding receiver terminal,
   wherein the wireless transmitter adjusts a resolution level allowable by each of the plurality of receiver terminals based on a data transmission rate extracted from the channel information of each of the plurality of receiver terminals connected in a wired or wireless manner.

9. A wireless multi-stream transmitter comprising:
   a multi-stream processing unit which adjusts a resolution level allowable by each of a plurality of receiver terminals and generates a scaling adjustment signal for scaling video signals using a resolution allowable by each receiver terminal based on channel information for each frequency band and resolution information of each of the plurality of receiver terminals, received from wireless receivers connected to the plurality of receiver terminals; and
   a scaler which scales video signals input from a video source based on a scaling adjustment signal generated in the multi-stream processing unit.

10. The wireless multi-stream transmitter according to claim 9, wherein the multi-stream processing unit comprises:
    a unit receiving channel information and resolution information of each receiver terminal from wireless receivers connected to a plurality of receiver terminals;
    a generator generating a scaling adjustment signal for scaling the video signals using a resolution allowable by each receiver terminal based on the channel information and the resolution information of each receiver terminal;
    an encoder encoding the scaled video signals according to a standard compression algorithm; and
    a converter converting the encoded video signals into radio frequency (RF) signals.

11. A wired/wireless transmitter/receiver system comprising:
    a wireless transmitter which adjusts a resolution level allowable by each of a plurality of receiver terminals and scales video signals by using supportable resolutions based on channel information and resolution information of the plurality of receiver terminals received from at least one wireless receiver, and encodes the video signals to transmit the encoded video signals to at least one wireless receiver for each frequency band; and a wireless receiver which receives the resolution information from the plurality of receiver terminals and transmits the resolution information and the channel information to the wireless transmitter, and receive the video signals scaled using the supportable resolutions based on the channel information and the resolution information of each of the plurality of receiver terminals from the wireless transmitter.

12. The wired/wireless transmitter/receiver system according to claim 11, wherein the wireless transmitter comprises:

a multi-stream processing unit which generates a scaling adjustment signal for scaling the video signals using the supportable resolutions of the receiver terminal based on the channel information for each frequency band and the resolution information of the receiver terminals; and a scaler which scales the video signals input from a video source based on the scale adjustment signal generated in the multi-stream processing unit.

* * * * *